(12) United States Patent
Witchey (10) Patent No.: US 7,815,211 B2
(45) Date of Patent: Oct. 19, 2010

(54) HITCH STORAGE DEVICE

(76) Inventor: Bryan Witchey, 209 Fairway Cir., Cross Junction, VA (US) 22625

( * ) Notice: Subject to any disclaimer, the term of this patent is extended or adjusted under 35 U.S.C. 154(b) by 595 days.

(21) Appl. No.: 11/693,667

(22) Filed: Mar. 29, 2007

(65) Prior Publication Data

US 2007/0228693 A1    Oct. 4, 2007

Related U.S. Application Data

(60) Provisional application No. 60/793,002, filed on Mar. 29, 2006.

(51) Int. Cl.
*B60D 1/14* (2006.01)

(52) U.S. Cl. ............... 280/491.5; 280/415.1; 280/416.1; 224/519

(58) Field of Classification Search ............... 280/491.1, 280/416.1, 415.1, 491.3, 491.5, 511; 224/519, 224/521
See application file for complete search history.

(56) References Cited

U.S. PATENT DOCUMENTS

| | | | |
|---|---|---|---|
| 2,685,468 A | | 8/1954 | Blocker et al. |
| 2,914,343 A | | 11/1959 | Roth |
| 2,916,302 A | | 12/1959 | Lippitt |
| 2,961,256 A | * | 11/1960 | Hinrichsen et al. ........ 280/491.5 |
| 4,662,647 A | * | 5/1987 | Calvert .................... 280/490.1 |
| 4,738,464 A | | 4/1988 | Putnam |
| 4,957,229 A | * | 9/1990 | Freeman .................... 224/405 |
| 5,277,448 A | | 1/1994 | Colibert |
| 5,358,269 A | * | 10/1994 | Jakeman et al. .......... 280/490.1 |
| 5,431,425 A | | 7/1995 | Klinkman |
| 5,476,279 A | | 12/1995 | Klemetsen |
| 5,489,111 A | | 2/1996 | Collins |
| 5,511,813 A | * | 4/1996 | Kravitz ...................... 280/495 |
| 5,595,333 A | * | 1/1997 | Boston ....................... 224/536 |
| 5,628,536 A | | 5/1997 | Fulkerson |
| 5,678,839 A | * | 10/1997 | Pobud et al. ............. 280/491.5 |
| 5,915,714 A | * | 6/1999 | Bell et al. ................ 280/456.1 |
| 6,039,227 A | * | 3/2000 | Stark .......................... 224/521 |
| 6,077,004 A | * | 6/2000 | Denman, Jr. .................. 410/8 |
| 6,149,181 A | | 11/2000 | Biederman |

(Continued)

FOREIGN PATENT DOCUMENTS

GB       2205291 A       12/1988

OTHER PUBLICATIONS

"Hidden Hitch Class III Trailer Hitch Receiver," website: http://www.etrailer.com/Merchant2/merchant.mv?Screen=PROD&Store_Code=E&Product_Code=87718, 3 pages, printed from the Internet on Oct. 6, 2005.

(Continued)

*Primary Examiner*—Lesley Morris
*Assistant Examiner*—Maurice Williams (57) ABSTRACT

A hitch storage device for securing a hitch to a vehicle that minimizes risk of accidental painful contact between the hitch and the operator of the vehicle. The hitch storage device includes a connecting member, a male hitch member, a hitch-support bracket, and a male protrusion member. The hitch storage device incorporates an integral passive securing mechanism whereby a hitch is secured without having to use an active hitch-securing device such as a bolt to secure the hitch shaft to the hitch storage device of the present invention. In a further embodiment, the male hitch member and hitch-support bracket are integrated to provide an L-shaped bracket with an integral sidewall.

4 Claims, 8 Drawing Sheets

U.S. PATENT DOCUMENTS

| | | | |
|---|---|---|---|
| 6,203,048 B1 | 3/2001 | Adair | |
| 6,234,512 B1 * | 5/2001 | Bettenhausen | 280/491.1 |
| 6,481,258 B1 | 11/2002 | Belinky | |
| 6,502,771 B1 * | 1/2003 | Wyne | 239/663 |
| 6,502,845 B1 * | 1/2003 | Van Vleet | 280/491.1 |
| 6,527,292 B2 | 3/2003 | Adair | |
| 6,712,381 B1 | 3/2004 | Moss | |
| 6,789,815 B2 * | 9/2004 | Moss et al. | 280/416.1 |
| 6,832,709 B2 | 12/2004 | Henry | |
| 6,866,285 B1 | 3/2005 | Stamp | |
| 6,874,806 B1 | 4/2005 | Blake | |
| 7,055,844 B1 * | 6/2006 | Bostedt | 280/491.5 |
| 7,204,505 B2 * | 4/2007 | Moss | 280/491.1 |
| 2002/0017770 A1 | 2/2002 | Parrish | |
| 2003/0071440 A1 * | 4/2003 | Gries et al. | 280/491.5 |
| 2003/0218314 A1 | 11/2003 | Moss | |
| 2004/0104558 A1 | 6/2004 | Williams | |
| 2004/0232653 A1 | 11/2004 | Kaepp et al. | |
| 2006/0220347 A1 | 10/2006 | Witchey | |

OTHER PUBLICATIONS

"Removable Trailer Hitch," website: http://saabpartspeople.com/SearchProduct.asp?Model=9-3&catid=325288455748140&year=03&productdesc=Removable+Trailer+Hitch, 1 page, printed from the Internet on Nov. 16, 2005.

"Trailer Hitches," website: http://www.vehiclefx.com/index.asp?PageAction=VIEWCATS&Category=17, 2 pages, printed from the Internet on Nov. 16, 2005.

* cited by examiner

HITCH STORAGE DEVICE

CROSS-REFERENCE TO RELATED APPLICATIONS

This application claims the benefit of priority from U.S. Provisional Patent Application Ser. No. 60/793,002, filed Mar. 29, 2006, the entire contents of which are incorporated herein by reference.

STATEMENT REGARDING FEDERALLY SPONSORED RESEARCH OR DEVELOPMENT

Not Applicable.

FIELD OF THE INVENTION

This invention is directed to a hitch storage device.

BACKGROUND OF THE INVENTION

Many modern vehicles, such as trucks and sports utility vehicles (SUVs) make use of a tube type hitch receiver. When not in use, it is not uncommon for a hitch attached to such a hitch receiver to protrude some distance beyond the vehicle's rear bumper. Hitches that stick out beyond the rear bumper can lead to injuries wherein a person may bump into the hitch and sustain injuries to legs and knees. A driver might forget that the attached hitch is protruding beyond the vehicle's rear bumper and may inadvertently hit another vehicle while reversing. Drivers of other vehicles may not notice the protruding hitch and make inappropriate contact thereby causing damage to both vehicles.

The problem presented, therefore, for many drivers is where to put the hitch to avoid mishaps. Some drivers decide to remove their vehicle's hitch and place it inside or elsewhere on the vehicle. Such a strategy often leads to other problems. For example, a hitch placed on the bed of a pick-up truck may roll about during road trips and cause damage to the bed of the pick-up truck. The hitch is also easier to steal if left in the bed of a pick-up truck.

The driver might decide to remove the hitch and store it, for example, on or in his/her house or garden shed and later retrieve the hitch when needed. If the driver is located some way from his home and finds he/she needs to use the hitch, this set of circumstances may require the driver to go to a vendor of hitches and purchase a new hitch for immediate use.

A hitch is often greasy, and grease may be inadvertently transferred from the hitch and cause accidental soiling of carpet or furniture. Thus, there is a need for a hitch storage device that stores the hitch proximate to the vehicle's hitch receiver while negating the issue of the attached hitch protruding beyond the vehicle's rear bumper.

U.S. Patent Publication No. 20060220347, published Oct. 5, 2006 to Witchey, describes a hitch storage device that includes a connecting member having a first surface and a second surface; a male hitch member protruding outwards from and connected to the second surface; a female hitch member connected to the second surface; and a hitch-securing member attached to the female hitch member. The male hitch member and the female hitch member when looked at from above are perpendicular to each other. The maximum distance between the hitch-securing member (180) and the male hitch member is a predetermined distance $C_{MAX}$ so chosen to ensure that the hitch-securing member cannot separate completely from the female hitch member.

U.S. Pat. No. 6,203,048, issued Mar. 20, 2001 to Adair, describes a method and apparatus, including a combination linch-pin stowage adapter, for positioning a ball mount member of most class 2, 3, & 4 trailer hitches in both an operating and non operating retracted position on a trailer hitch receiver mounted underneath a vehicle.

U.S. Pat. No. 6,149,181, issued to Biederman, describes a retractable hitch that stores away from view. The hitch consists of a hollow connector bar having an attachment end and a receiver end. The attachment end of the connector bar has an opening extending laterally through it. A mounting bar at the receiver end contains a storage chamber. A draw bar having a connector end and a hitch end fits within the connector bar. The connector end has an opening piercing it, and the hitch end has an end for connecting devices. A locking pin extends through the opening in the attachment end of the connector bar and the opening in the connector end of the draw bar. The locking pin locks in a first position for securing the draw bar in a first position for attaching devices and a second position for storing the connector bar within the storage chamber.

U.S. Pat. No. 6,832,709 B2, issued to Henry, describes a holder and method of use for storing a ball mount having a stem and a ball supported on the stem in a ball hitch in which the stem is slidably received within a receiver supported on a vehicle. The holder includes a pocket for slidably receiving the stem therein and mounting means for mounting the pocket on a supporting surface of the vehicle, for example a sidewall of a truck box. The use of a pocket with suitable mounting means for mounting to a supporting surface of the vehicle while securing the stem of a ball mount therein provides proper storage for ball mounts, which are not in use. The result is that potentially damaging or annoying sliding movement of the ball mounts within a moving vehicle can be prevented.

Patent Application Publication U.S. 20020017770 A1, published to Parrish, describes a receptacle mounted at a predetermined location for storing various tow hitch apparatuses and assemblies. Behind the mounting surface, the area may be hollow such as a standard dwelling wall or solid such as a brick or concrete wall found in a basement. The '770 device may be mounted on a floor or wall of a vehicle storage compartment. The dimensions of the invention are such that it can in one embodiment receive the standard two-inch male connector and in other embodiments receive other standard male portions of a tow hitch apparatus. In particular, the invention is designed to receive the various racks that have become popular for carrying sports equipment. These rigid racks attach to the standard trailer hitch receptacle found on many vehicles.

SUMMARY OF THE INVENTION

A hitch storage device for securing a hitch to a vehicle that minimizes risk of accidental painful contact between the hitch and the operator of the vehicle. The hitch storage device includes a connecting member, a male hitch member, a hitch-support bracket, and a male protrusion member. The hitch storage device incorporates an integral passive securing mechanism whereby a hitch is secured without having to use an active hitch-securing device such as a bolt to secure the hitch shaft to the hitch storage device of the present invention.

In a further embodiment, the male hitch member and hitch-support bracket are integrated to provide an L-shaped bracket with an integral sidewall.

BRIEF DESCRIPTION OF THE DRAWINGS

Similar reference characters denote corresponding features consistently throughout the attached drawings.

DETAILED DESCRIPTION OF THE PREFERRED EMBODIMENTS

This invention is directed to a hitch storage device. The hitch storage device of the invention is denoted generally by the numeric label "500".

Figure 1:
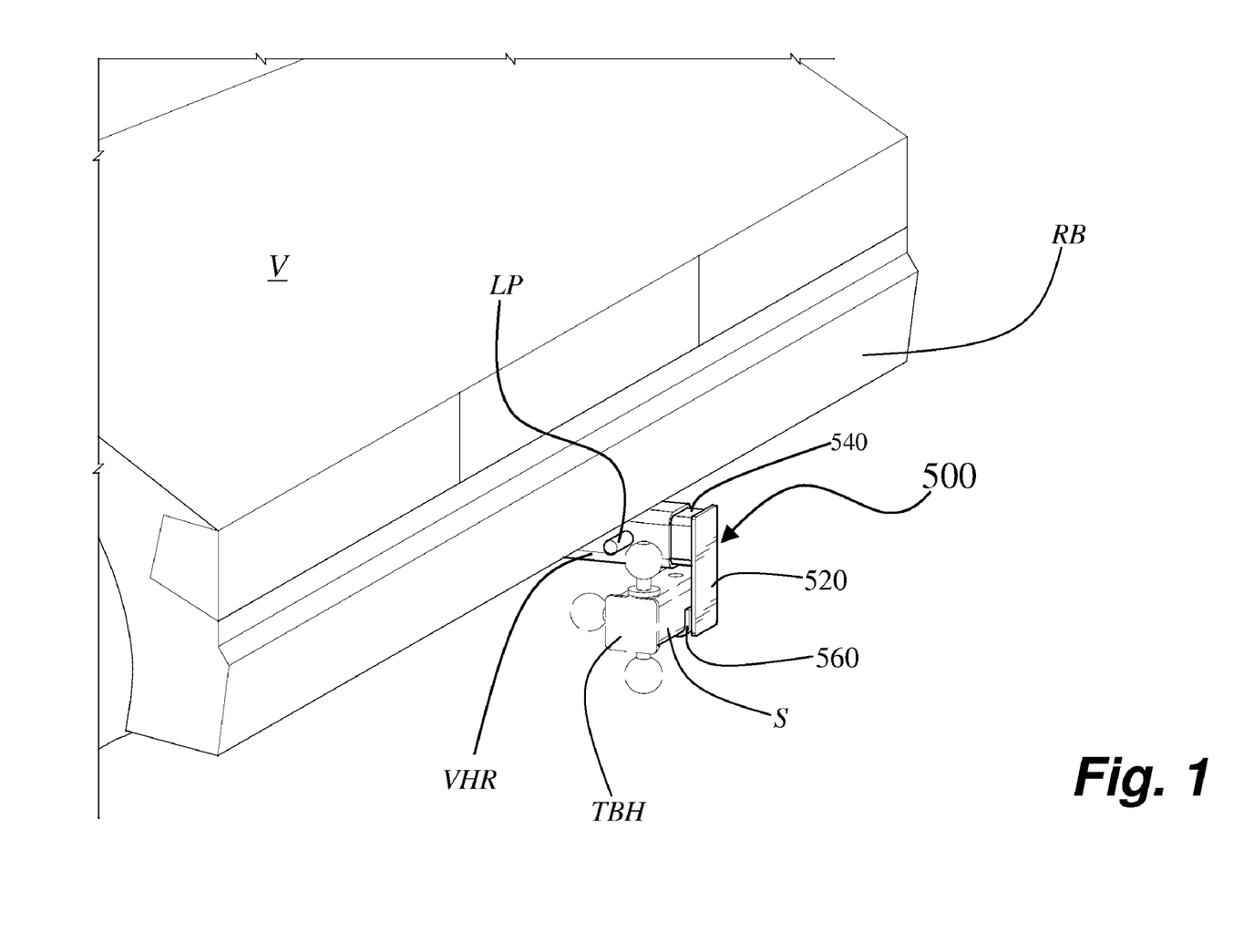
FIG. 1 is an environmental perspective view of the hitch storage device, according to the present invention.

FIGS. 1 through 4 show perspective views of one embodiment of the present invention in which the hitch storage device 500 comprises a connecting member 520, a male hitch member 540, a hitch-support bracket 560, and a male protrusion member 580. The connecting member 520 is a generally planar structure of overall rectangular shape and possesses sufficient resilience (e.g., thickness and stiffness) to resist deformation when supporting the weight of a hitch such as, but not limited to, a standard tri-ball hitch TBH, an example of which is shown in FIG. 1. The connecting member 520 defines opposite first 600 and second 620 sides. The connecting member 520 includes a top 640 and a bottom 660.

Still referring to FIGS. 1 through 4, the male hitch member 540 is of generally overall tubular shape with top 680 and bottom 700 sidewalls, and first 720 and second 740 opposite sidewalls, and further defines first 760 and second 780 opposite ends. The male hitch member's first end 760 is connected to the connecting member 520 such that the male hitch member 540 protrudes from the top 640 of the connecting member and in a perpendicular direction from the first side 600 of the connecting member 520, the male hitch member's second end 780 is dimensioned to fit inside a vehicle's hitch receiver VHR (see, e.g., FIGS. 1 and 4). The bottom sidewall 700 defines a bottom sidewall exterior surface 710.

Still referring to FIGS. 1 through 4, the hitch-support bracket 560 has a U-shaped cross-section. The hitch-support bracket 560 includes bottom side 800, a bottom inner surface 820, and first 840 and second 860 opposite bracket-sidewalls. The first bracket-sidewall 840 is attached lengthwise to the bottom 660 of the connecting member 520 such that the male hitch member 540 and the hitch-support bracket 560 are connected to the first side 600 of the connecting member 520 and the first 840 and second 860 opposite bracket-sidewalls are disposed in an upward direction and parallel to the connecting member 520.

Still referring to FIGS. 1 through 4, the male protrusion member 580 is disposed on and extends upwards for a predetermined height from the bottom inner surface 820 of the hitch-support bracket 560. The male protrusion member 580 has any suitable cross-section shape such as a circular cross-section or a polygonal cross-section shape. The height and cross-section of the male protrusion member 580 are dimensioned to fit into a locking-pin aperture LPA on the shaft S of a hitch such as, but not limited to, a tri-ball hitch TBH (see, e.g., FIG. 1) or a single-ball hitch SBH (an example of which is shown in end view in FIG. 4). A locking-pin aperture LPA on A shaft S of a hitch is shown in dotted outline in FIG. 4.

Figure 4:
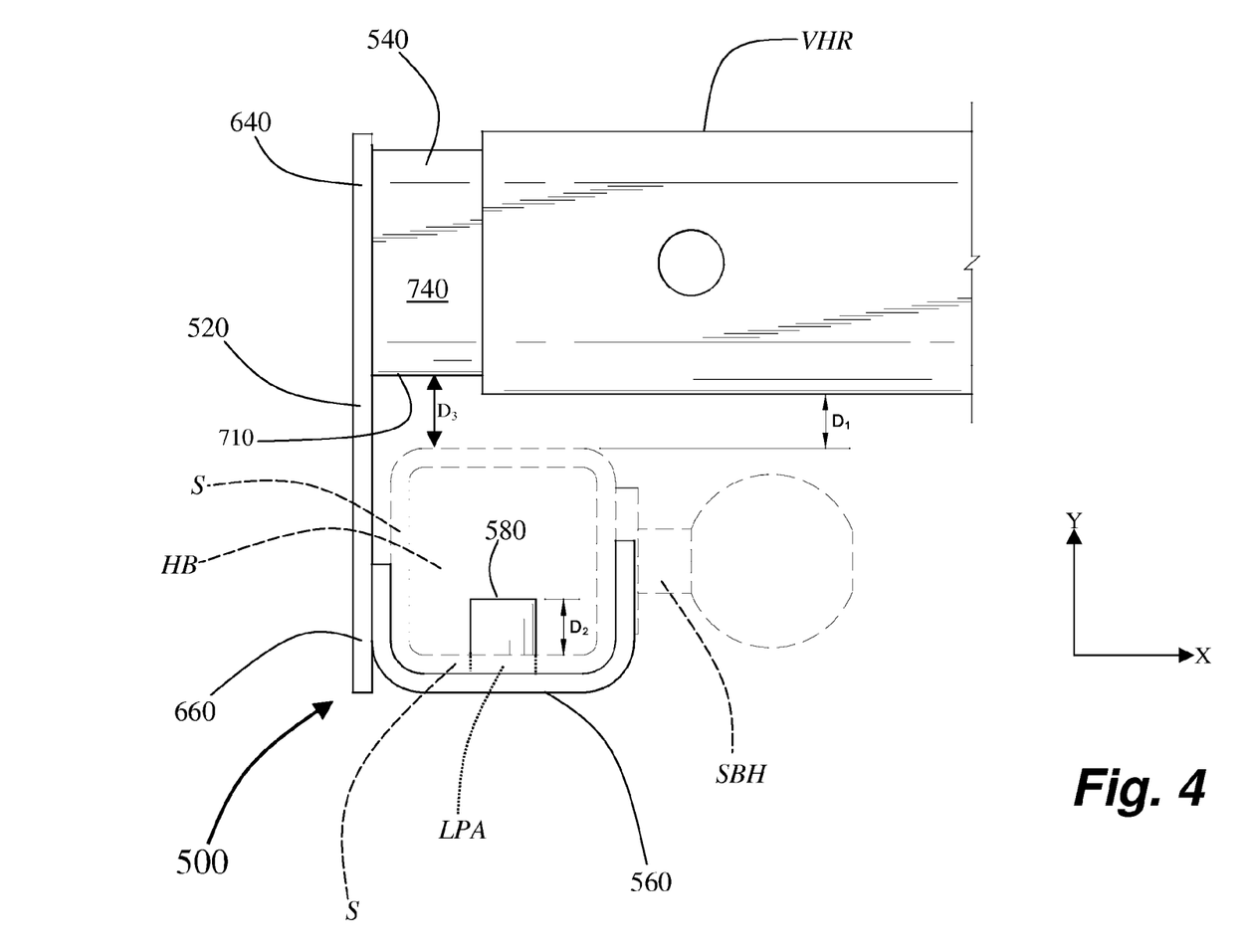
FIG. 4 shows a side-view of the hitch storage device of FIG. 1 connected to a vehicle's hitch receiver and with a hitch stored in the hitch storage device.

Referring to FIG. 4, the height $D_2$ of the male protrusion member 580 is selected to secure the shaft S of a hitch via shaft's LPA without allowing the shaft S to slip or fall away when the male hitch member 540 is inserted into a vehicle hitch receiver VHR. For a given hitch shaft S the dimensions of the hitch storage device 500 are selected to ensure that the distance $D_1$ between the top of shaft S (once placed in hitch-support bracket 560) and the vehicle's hitch receiver VHR is less than the height $D_2$ of the male protrusion member 580, but upon removing the male hitch member 540 from the vehicle's hitch receiver VHR the shaft S is easily removed from the hitch-support bracket 560, i.e., there is sufficient clearance (represented by distance $D_3$ in FIG. 4) to allow the shaft S to be easily removed from the hitch-support bracket 560; and conversely there is sufficient clearance for the shaft S to be placed on the hitch-support bracket 560 once the shaft's LPA and member 580 are lined up and member 580 allowed to penetrate through the shaft's LPA and thence penetrate someway into the hollow bore HB of the shaft S. In one expressly non-limiting aspect of the invention $D_3>D_2>D_1$ and $D_1<D_2<D_3$ (i.e., $D_3$ is greater than $D_2$ and $D_2$ is greater than $D_1$, and conversely $D_1$ is less than $D_2$ is less than $D_3$).

Thus, the preferred way of using the hitch storage device 500 of the present invention to store a hitch includes the steps of: (1) placing the shaft S on the U-shaped hitch-support bracket 560 and maneuvering the shaft S to align the locking-pin aperture LPA on the shaft S directly over the male protrusion member 580 and lowering the shaft S such that the shaft S is secured by the male protrusion member 580 penetrating the locking-pin aperture LPA on the shaft S; (2) inserting the male hitch member 540 into a vehicle's hitch receiver VHR and (3) securing the male hitch member 540 to the vehicle's hitch receiver VHR using a locking pin LP (shown in FIG. 1).

Once the male hitch member 540 is secured inside a vehicle hitch receiver VHR the shaft S is firmly secured on U-shaped hitch-support bracket 560. Specifically, the vehicle hitch receiver VHR reduces the clearance between the shaft S and the vehicle hitch receiver VHR such that the shaft S is secured on the U-shaped hitch-support bracket 560 and thereby remains firmly attached and safely secured and stored in the hitch storage device 500.

Figure 5:
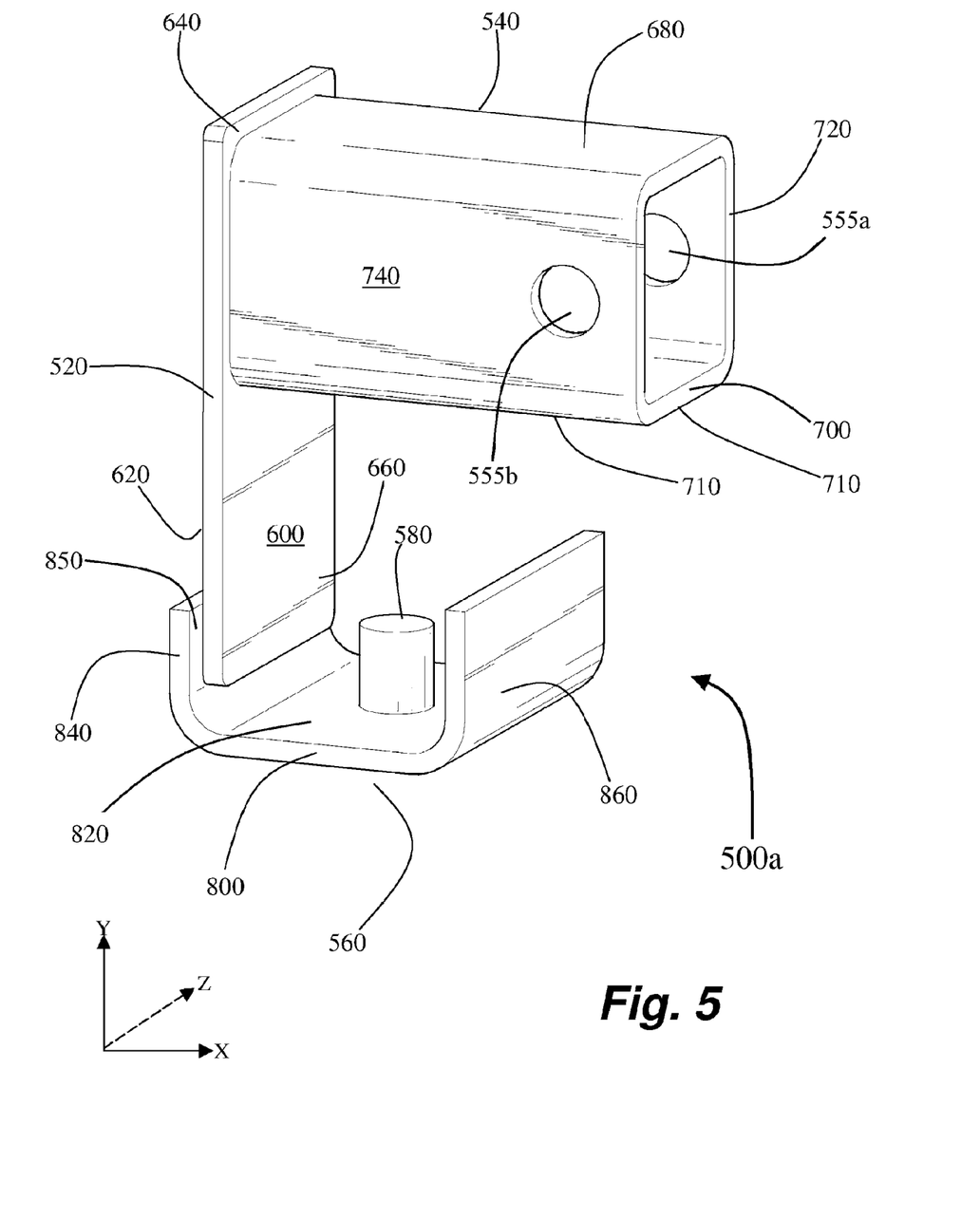
FIG. 5 shows a view of the hitch storage device according to the present invention.

FIG. 5 shows another aspect of the invention (represented by the alphanumeric label "500a" in FIG. 5), which is similar to the embodiment shown in FIGS. 1 through 4 except that the hitch-support bracket 560 is attached to second side 620 at the bottom 660 of the connecting member 520. Specifically side bracket-sidewall 840 is attached to the second side 620 at the bottom 660 of the connecting member 520. Still more specifically, bracket-sidewall 840 defines an interior surface 850, which is attached (e.g., by welding) to the second side 620 at the bottom 660 of the connecting member 520.

In more detail, FIG. 1 is an environmental perspective view of a first embodiment of the hitch storage device 500. The hitch storage device 500 is shown attached to a vehicle V, and more particularly to the vehicle's hitch receiver VHR. A tri-ball hitch TBH is shown stored in the hitch storage device 500 proximate to and below the vehicle's hitch receiver VHR and parallel to the vehicle's rear bumper RB thereby reducing the risk of someone coming into harmful contact with the tri-ball hitch TBH. It will be understood by a person of ordinary skill in the art that the hitch storage device 500 of the invention is expressly not limited to safely storing a tri-ball hitch TBH. The hitch storage device 100 can be used to safely store any kind of hitch designed to fit into a vehicle's hitch receiver VHR such as, but not limited to, a single ball hitch SBH (see FIG. 4).

The components that make up hitch storage device 500 can be made of steel, but any material that is sufficiently durable may be used. For example, the connecting member 520, a male hitch member 540, a hitch-support bracket 560, and a male protrusion member 580 can be made of a suitable gauge steel and welded together by at least one weld 560. The various parts of the hitch storage device 500 can be attached to each other by any suitable means such as epoxy-based adhesive or by at least one weld. For example, the male hitch member 540, a hitch-support bracket 560 can be welded to the connecting member 520.

Figure 2:
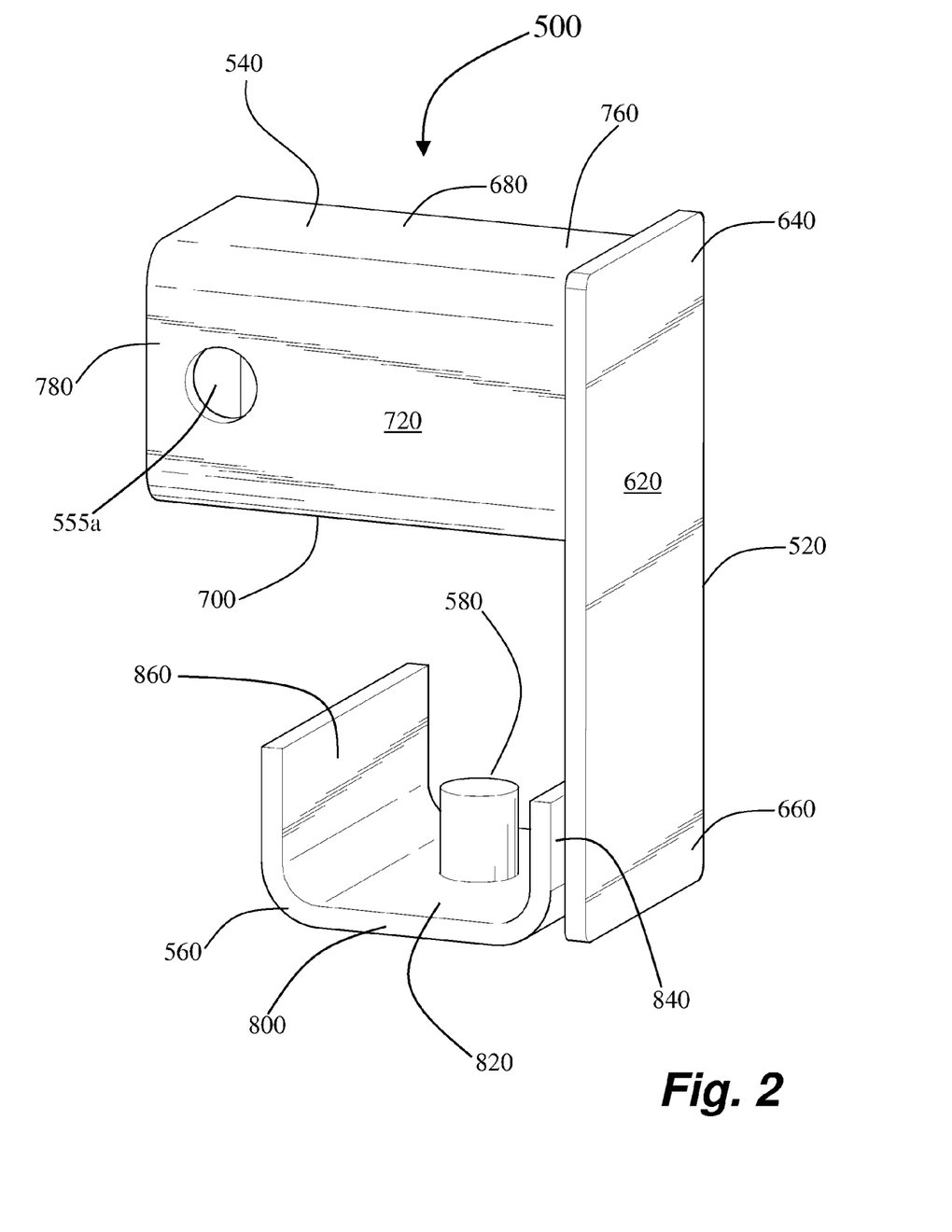
FIGS. 2 through 3 show perspective views of the hitch storage device, according to the present invention.
Figure 3:
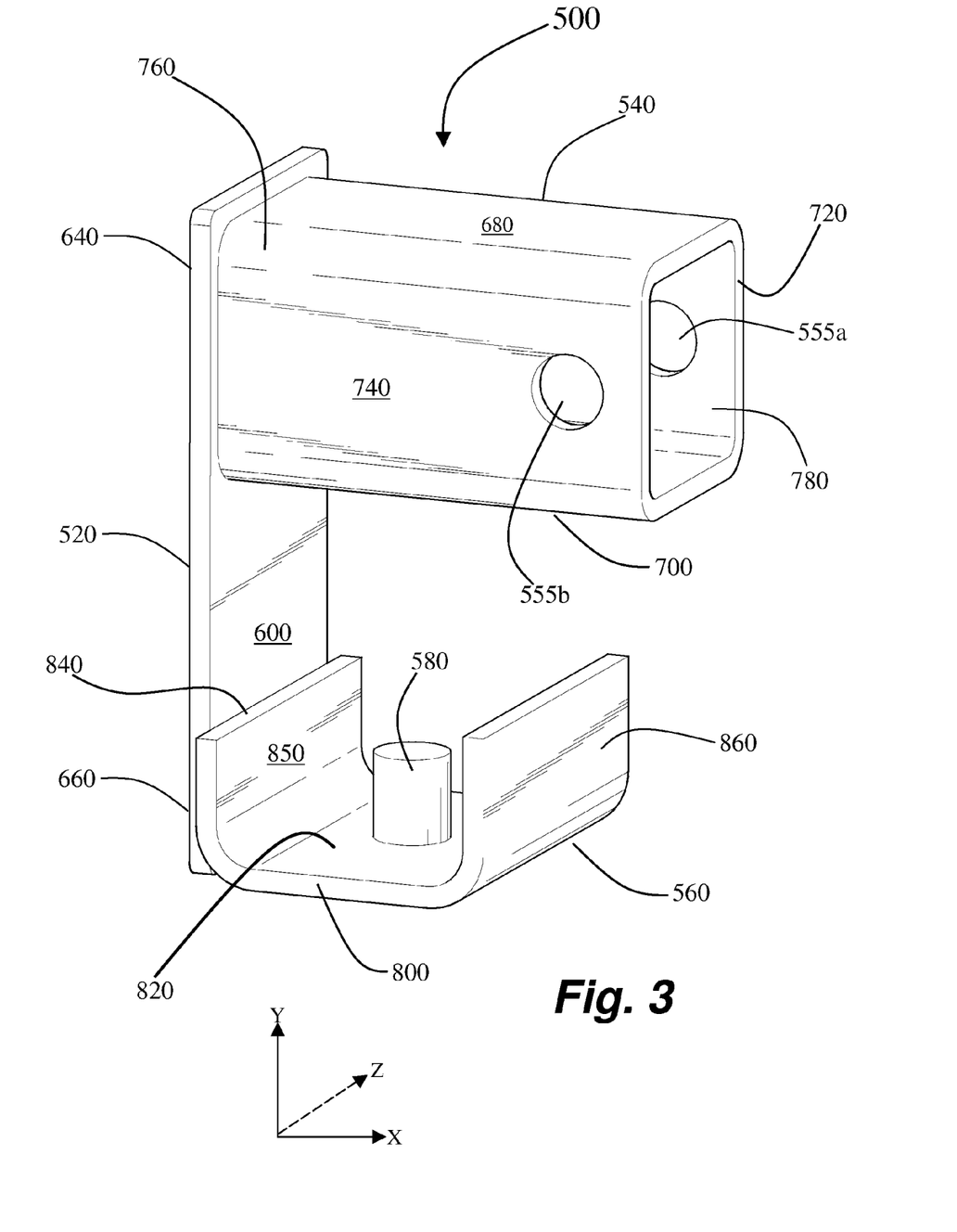

FIGS. 2 through 3 show perspective views of the hitch storage device 500. The male hitch member 540 is preferably fitted with aligned apertures 555a and 555b for accepting locking pin LP (see FIG. 1). FIG. 4 shows a side of the hitch storage device 500 when fitted to a vehicle's hitch receiver vehicle's hitch receiver VHR. FIG. 5 shows a further aspect of the invention in which the hitch-support bracket 560 is secured (e.g., by welding) to the second side 620 of connecting member 520.

Figure 6:
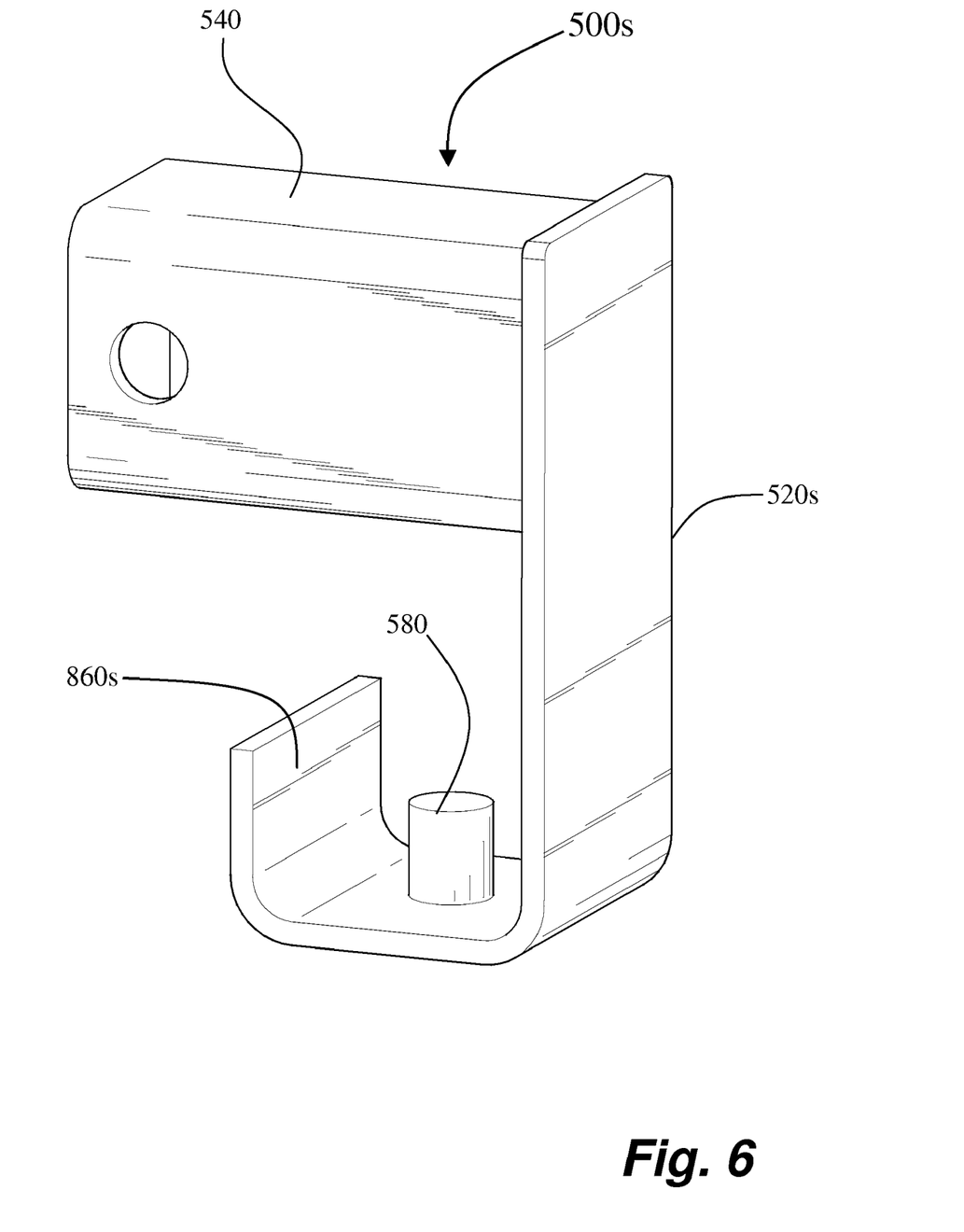
FIG. 6 shows a view of a further embodiment of the hitch storage device according to the present invention.
Figure 7:
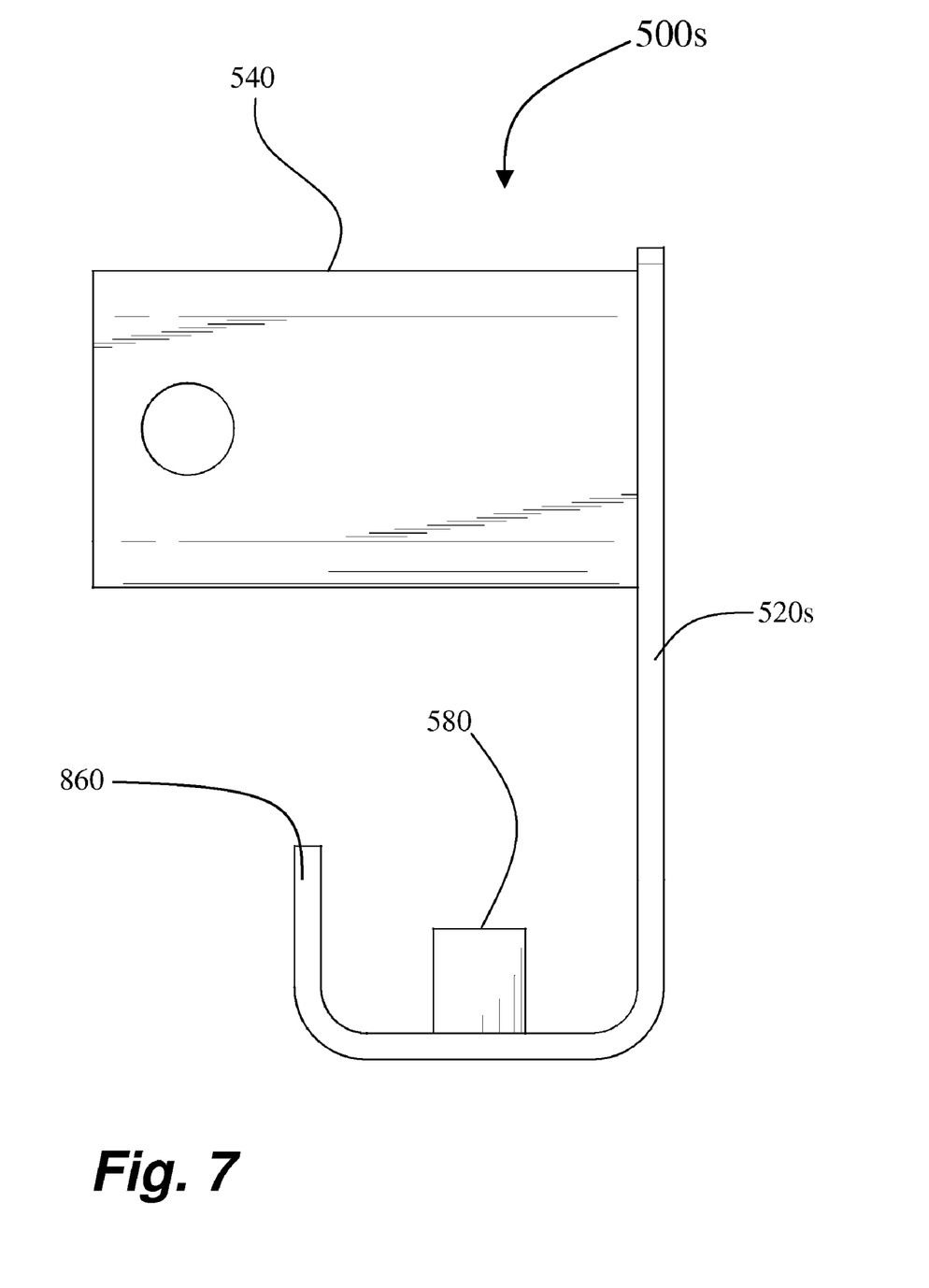
FIG. 7 shows a side-view of the hitch storage device shown in FIG. 6.
Figure 8:
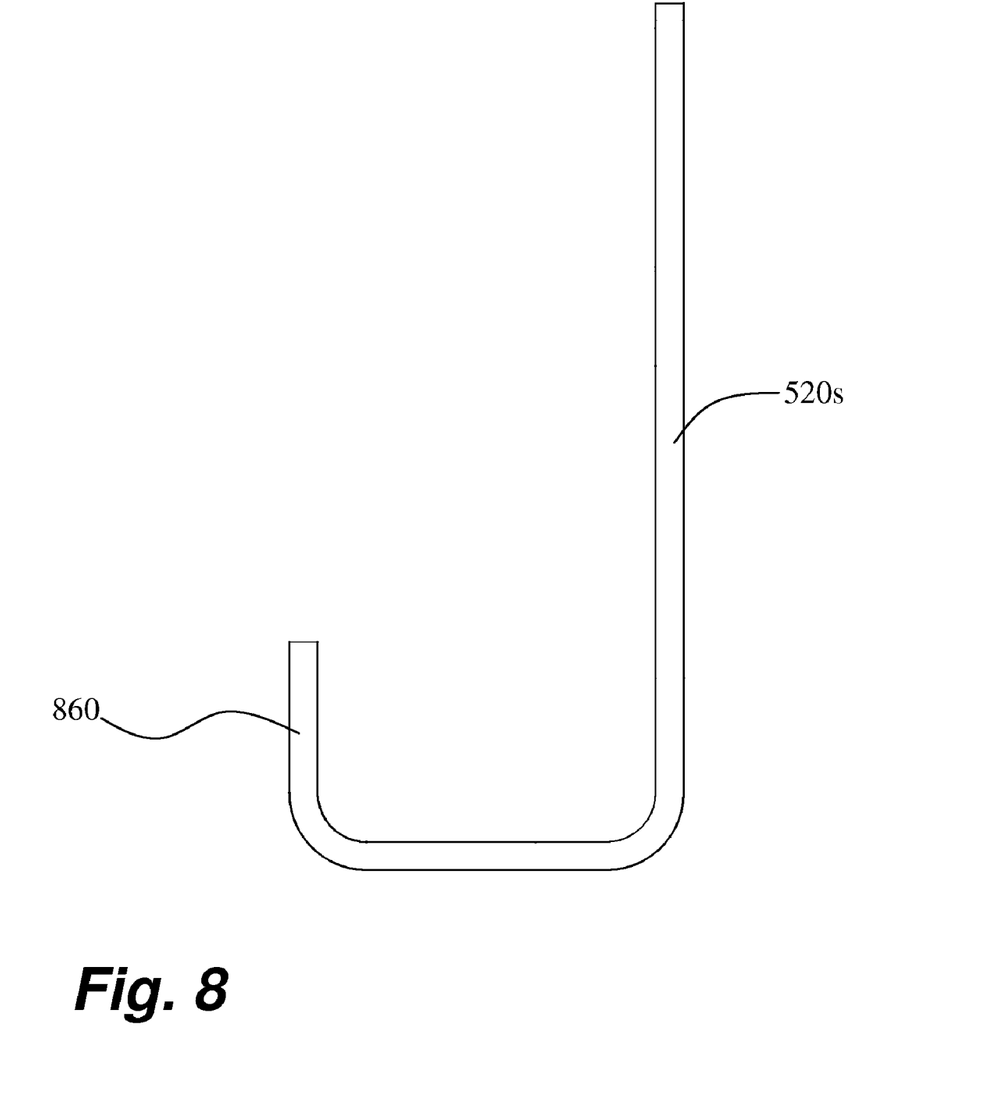
FIG. 8 shows a bracket component used in the embodiment shown in FIGS. 6 and 7.

It will be understood by a person of ordinary skill in the art that various components of the hitch storage device 500 can be integrated. For example, the connecting member 520 and the hitch-support bracket 560 can be integrated to form an L-shaped bracket 520s (see FIG. 8) with an integral sidewall 860s equivalent in function to sidewall 860 of U-shaped bracket 560. This further embodiment of the hitch storage device is shown in FIGS. 6 through 8; this specific embodiment of the hitch storage device is actually represented by alphanumeric label 500s in FIGS. 6 through 8.

A design, symbol, number, light, decoration or application may be adhered to, engraved, built-in, affixed in some way to any part of the surface of the hitch storage device 500 for design, marketing, usefulness, or aesthetics.

It is to be understood that the present invention is not limited to the embodiments described above, but encompasses any and all embodiments within the scope of the following claims.

I claim:

1. A hitch storage device comprising:
   a connecting member of generally planar structure and having a top, bottom and first and second opposite sides, wherein during normal use said connecting member is disposed in a y-axis direction;
   a male hitch member of generally overall tubular shape attached to the top of said connecting member such that the male hitch member extends outward in an x-axis direction at a perpendicular direction from said first side of said connecting member, said male hitch member defining first and second opposite sidewalls and top and bottom sidewalls;
   a hitch-support bracket having a U-shaped cross section, said U-shaped cross section defining first and second opposite bracket-sidewalls and a bottom side, said bottom side defining a bottom inner surface, wherein one of the opposite bracket-sidewalls of said hitch-support bracket is attached to the bottom of said connecting member and extends from said first side of said connecting member such that the opposite bracket-sidewalls of the hitch-support bracket point towards the bottom sidewall of said male hitch member; and
   a male protrusion member attached to the bottom inner surface of said hitch-support member and extending upwards parallel to said first and second opposite bracket sidewalls in a y-axis direction from said bottom inner surface,
   wherein during normal use a hitch is held is secured by said male protrusion member and held in place between said bottom inner surface of said hitch-support member and said male hitch member.

2. The hitch storage device according to claim 1, wherein said male protrusion member has a circular cross-section shape.

3. The hitch storage device according to claim 1, wherein said male hitch member and said hitch-support bracket are integrated to provide an L-shaped bracket (520s) with an integral sidewall (860s).

4. A hitch storage device comprising:
   a connecting member, said connecting member is a generally planar structure of overall rectangular shape and sufficient thickness to resist deformation when supporting the weight of a hitch, said connecting member defining opposite first and second sides, wherein said connecting member defines a top and a bottom;
   a male hitch member of generally overall tubular shape with top and bottom sidewalls and first and second opposite sidewalls and having first and second opposite ends with said male hitch member's first end connected to said connecting member such that said male hitch member protrudes outwards from the top of said connecting member and in a perpendicular direction from the first side of said connecting member, said male hitch member's second end is dimensioned to fit inside a vehicle hitch receiver;
   a hitch-support bracket having a U-shaped cross-section, said bracket defining a bottom inner surface and first and second opposite bracket-sidewalls, wherein the first bracket-sidewall is attached lengthwise to the bottom of said connecting member such that said male hitch member and said hitch-support bracket are connected to the same side of said connecting member and said first and second bracket-sidewalls are disposed in an upward direction whereby the first and second bracket-sidewalls point towards the bottom sidewall of said male hitch member; and
   a male protrusion member disposed on and extending upwards for a predetermined height from the bottom inner surface of said hitch-support bracket,
   wherein during actual use of said hitch storage device said connecting member is orientated generally in a vertical y-axis direction with said male hitch member disposed inside a vehicle hitch receiver, and a hitch shaft stored on said bracket.

* * * * *